United States Patent
Yamada et al.

(10) Patent No.: US 8,520,651 B2
(45) Date of Patent: Aug. 27, 2013

(54) PORTABLE DEVICE AND METHOD, COMPUTER PROGRAM PRODUCT AND COMPUTER READABLE RECORDING MEDIUM FOR SETTING OPERATION MODE FOR PACKET TRANSFER

(75) Inventors: Daisuke Yamada, Nagoya (JP); Hidenori Yukawa, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 121 days.

(21) Appl. No.: 13/302,294

(22) Filed: Nov. 22, 2011

(65) Prior Publication Data
US 2012/0134308 A1 May 31, 2012

(30) Foreign Application Priority Data
Nov. 26, 2010 (JP) .................. 2010-264136

(51) Int. Cl.
*H04W 4/00* (2009.01)
*H04B 7/14* (2006.01)

(52) U.S. Cl.
USPC .......................................... 370/338; 370/315

(58) Field of Classification Search
None
See application file for complete search history.

(56) References Cited

U.S. PATENT DOCUMENTS

2006/0077934 A1*  4/2006  Lee et al. ............... 370/331
2010/0111055 A1*  5/2010  Chiu et al. .............. 370/338

FOREIGN PATENT DOCUMENTS

| JP | 2003-101546 A | 4/2003 |
| JP | 2005-33317 A | 2/2005 |
| JP | 2005-142907 A | 6/2005 |
| JP | 2006-20017 A | 1/2006 |
| JP | 2008-42834 A | 2/2008 |
| JP | 2008-54145 A | 3/2008 |
| JP | 2012-44477 A | 3/2012 |

OTHER PUBLICATIONS

Japanese Office Action Issued Oct. 2, 2012 in Patent Application No. 2010-264136 (English translation only).

\* cited by examiner

*Primary Examiner* — Clemence Han
(74) *Attorney, Agent, or Firm* — Oblon, Spivak, McClelland, Maier & Neustadt, L.L.P.

(57) ABSTRACT

A portable device configured to be connected to a router via a wireless or wired connection. The portable device includes a first processing section that operates in each of a first operation mode to serve as a bridge functional part and a second operation mode to serve as a router functional part. The first processing section operates in the first operation mode when the portable device is connected to the router.

18 Claims, 16 Drawing Sheets

<FIRST CONNECTION STATUS>

<SECOND CONNECTION STATUS>

<THIRD CONNECTION STATUS>

DISCONNECTED

SECOND EMBODIMENT

<FOURTH CONNECTION STATUS>

THIRD EMBODIMENT

<FIFTH CONNECTION STATUS>

Fig.17

THIRD EMBODIMENT

| No. | PROFILE NAME | BRIDGE FIXATION | USE I/F | DETAILED SETTINGS |
|---|---|---|---|---|
| 1 | FOR WIRELESS CONNECTION WITH HOME GATEWAY | ON | WIRELESS WAN I/F | ESSID: xxxx<br>ENCRYPTION SCHEME: xxxx<br>ENCRYPTION KEY: xxxx<br>MAC: xxxx |
| 2 | FOR OUTSIDE LOCATION | OFF | 3G/HSPA | CARRIER TYPE: xxxx<br>CONNECTION TYPE: xxxx<br>PIN: xxxx |
| 3 | FOR HOT SPOT | ON | WIRELESS LAN I/F | ESSID: xxxx<br>ENCRYPTION SCHEME: xxxx<br>ENCRYPTION KEY: xxxx<br>MAC: xxxx |

PORTABLE DEVICE AND METHOD, COMPUTER PROGRAM PRODUCT AND COMPUTER READABLE RECORDING MEDIUM FOR SETTING OPERATION MODE FOR PACKET TRANSFER

CROSS-REFERENCE TO RELATED APPLICATION

This application claims the benefit of priority under 35 U.S.C. §119 to Japanese Patent Application No. 2010-264136 filed on Nov. 26, 2010, the disclosure of which is hereby incorporated by reference in its entirety.

BACKGROUND

1. Technical Field

This disclosure relates to relay technology in a wireless communication network.

2. Related Art

In homes and offices, wireless LAN access points (hereinafter also called "access point") have widely been used to connect wireless LAN clients (hereinafter also called "client") such as personal computers and game machines to the network. Connecting the access point to a router enables the client to access the Internet via the access point and the router. The router is provided, for example, as a home gateway by an ISP (Internet Service Provider).

Portable (mobile) devices have been proposed as the access point. An example of such devices is a device (portable network connection device) having a functional part for wireless communication via a mobile communication network, e.g., 3G/HSPA (High Speed Packet Access) line, in addition to the functions as the access point. The user uses the portable network connection device to connect a personal computer to the Internet at an outside location. More specifically, by allowing the personal computer and the portable network connection device to respectively function as the client and as the access point, data can be transmitted from the personal computer to the portable network connection device. Additionally, by allowing the portable network connection device to function as the router, the portable network connection device can transmit data received from the personal computer to the Internet via the mobile communication network.

When the portable network connection device is brought back from the outside location and connected to the home network including the existing home gateway, two routers (i.e., devices having router functions) are simultaneously present in the home network. In this case, the client can not identify which of the routers is to be used as the gateway for data transfer with a device belonging to another network. There is accordingly a possibility that the client cannot normally transfer data with the device belonging to another network.

As described above, when the portable network connection device is brought outside, on the other hand, by allowing the portable network connection device to function as the router, the personal computer can access the Internet. Especially when the portable network connection device is used for connecting plural personal computers to the Internet, there is a need to enable the portable network connection device to serve as the router. Serving the portable network connection device as the router enables the plural personal computers to access the Internet via the portable network connection device by simply having an Internet-access service contract only for the portable network connection device with the ISP. In other words, it is not required to have an Internet-access service contract for each of the plural personal computers with the ISP. There is accordingly a need to enable the portable network connection device to serve as the router in the environment with no home gateway.

The function to be fulfilled by the portable network connection device in the presence of the home gateway and the function to be fulfilled by the portable network connection device in the absence of the home gateway have not been sufficiently considered. This problem may arise in company networks as well as home networks when a router is present separately from the portable network connection device.

Consequently, there is a need to enable the portable network connection device to serve adequately both in the presence of the router and in the absence of the router.

SUMMARY

According to a first exemplary embodiment, the disclosure is directed to a portable device configured to be connected to a router via a wireless or wired connection, the portable device comprising: a first processing section configured to operate in each of a first operation mode to serve as a bridge functional part and a second operation mode to serve as a router functional part, wherein the first processing section operates in the first operation mode when the portable device is connected to the router.

According to another exemplary embodiment, the disclosure is directed to a portable device configured to be connected to a router via a wireless or wired connection, the portable device comprising: a first processing section configured to operate in each of a first operation mode to serve as a bridge functional part or a second operation mode to serve as a router functional part, wherein the first processing section operates in the second operation mode when the portable device is disconnected from a router.

According to another exemplary embodiment, the disclosure is directed to a method of setting an operation mode for packet transfer in a portable device configured to be connected to a router via a wireless or wired connection, the method comprising: operating a processing section in the portable device in either a first operation mode to serve as a bridge functional part or a second operation mode to serve as a router functional part; and operating the processing section in the first operation mode when the portable device is connected to a router.

According to another exemplary embodiment, the disclosure is directed to a method of setting an operation mode for packet transfer in a portable device configured to be connected to a router via a wireless or wired connection, the method comprising: operating a processing section in the portable device in either a first operation mode to serve as a bridge functional part or a second operation mode to serve as a router functional part; and operating the processing section in the second operation mode when the portable device is disconnected from a router.

According to another exemplary embodiment, the disclosure is directed to a non-transitory computer-readable medium including computer program instruction, which when executed by a portable device, cause the portable device to perform a method comprising: operating a processing section in either a first operation mode to serve as a bridge functional part or a second operation mode to serve as a router functional part; and operating the processing section in the first operation mode when the portable device is connected to a router.

According to another exemplary embodiment, the disclosure is directed to a non-transitory computer-readable medium including computer program instruction, which when executed by a portable device, cause the portable device to perform a method comprising: operating a processing section in either a first operation mode to serve as a bridge functional part or a second operation mode to serve as a router functional part; and operating the processing section in the second operation mode when the portable device is disconnected from a router.

BRIEF DESCRIPTION OF THE DRAWINGS

FIG. 17 schematically shows the details of the candidate profiles according to the third embodiment.

DESCRIPTION OF THE EMBODIMENTS

A. First Embodiment

A1. Structure Of Device

Figure 3A:
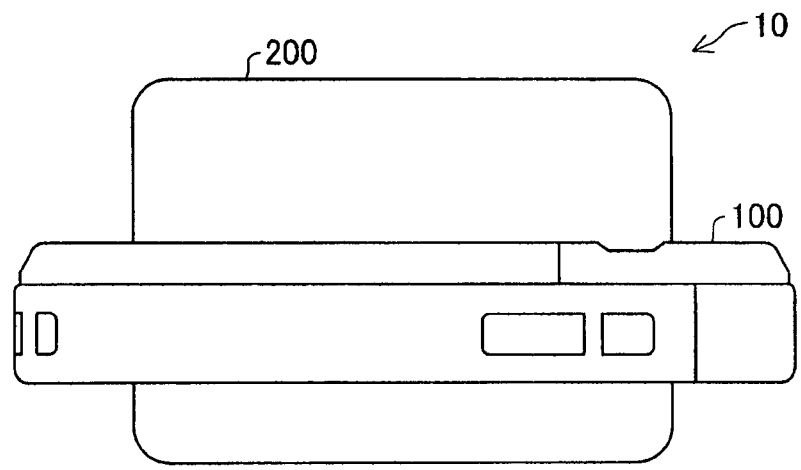
FIG. 3A illustrates the appearance of plane (top face) of the portable network connection device.
Figure 3B:
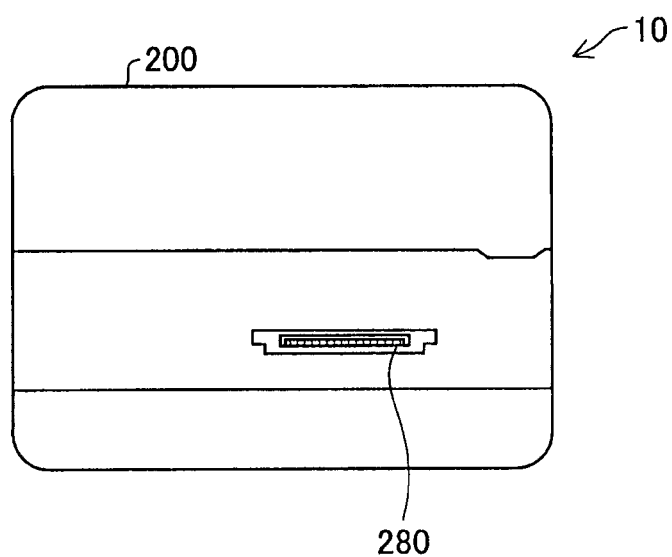
FIG. 3B illustrates the appearance of plane (top face) of a cradle of the portable network connection device.
Figure 4:
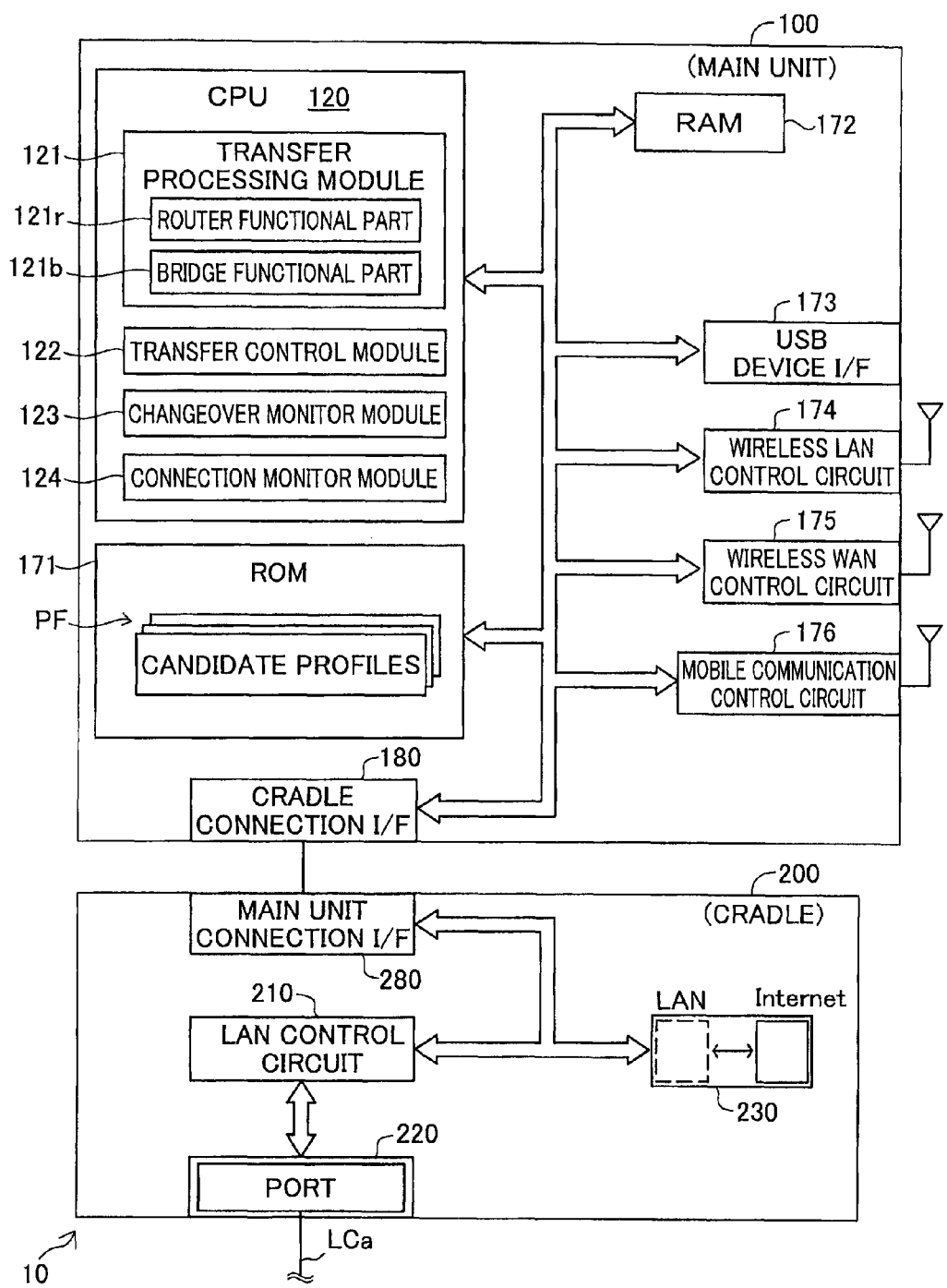
FIG. 4 illustrates the internal structure of the portable network connection device.

FIGS. 1 through 4 are schematic diagrams showing the structure of a portable network connection device 10 according to one embodiment of the disclosure. FIGS. 1A and 1B illustrate the appearance of front face and rear face of the portable network connection device 10. FIGS. 2A and 2B illustrate the appearance of one side face and the other side face of the portable network connection device 10. FIG. 3A illustrates the appearance of plane (top face) of the portable network connection device 10. FIG. 3B illustrates the appearance of plane (top face) of a cradle 200 of the portable network connection device 10. FIG. 4 illustrates the internal structure of the portable network connection device 10.

The portable network connection device 10 of the embodiment includes a main unit 100 and the cradle 200 detachably attached to each other. When the main unit 100 is attached to the cradle 200, the main unit 100 is connected with the cradle 200 to exchange information with the cradle 200. The main unit 100 is a small, lightweight portable device and functions as a wireless relay device. The cradle 200 connected with the main unit 100 provides the main unit 100 with various functions. Additionally, the cradle 200 serves as a recharger and holder for the main unit 100.

Figure 1A:
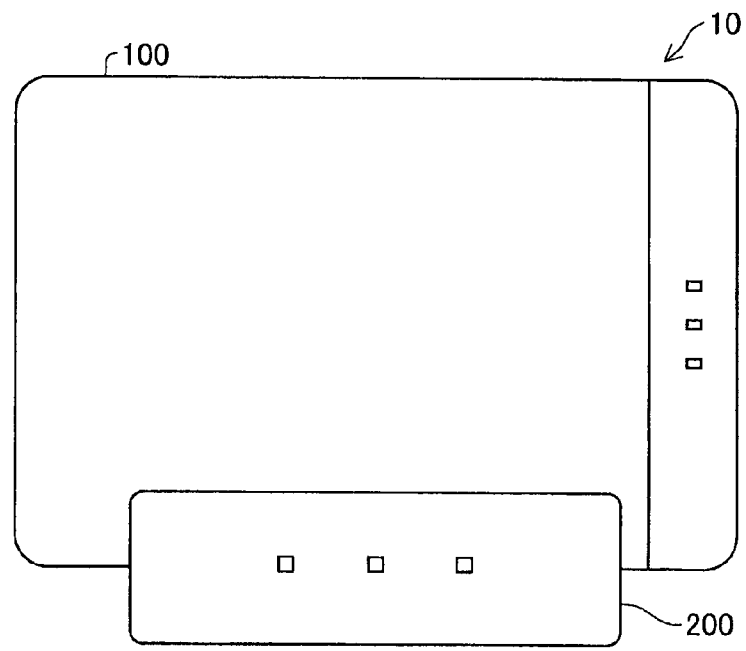
FIGS. 1A and 1B illustrate the appearance of front face and rear face of the portable network connection device.
Figure 1B:
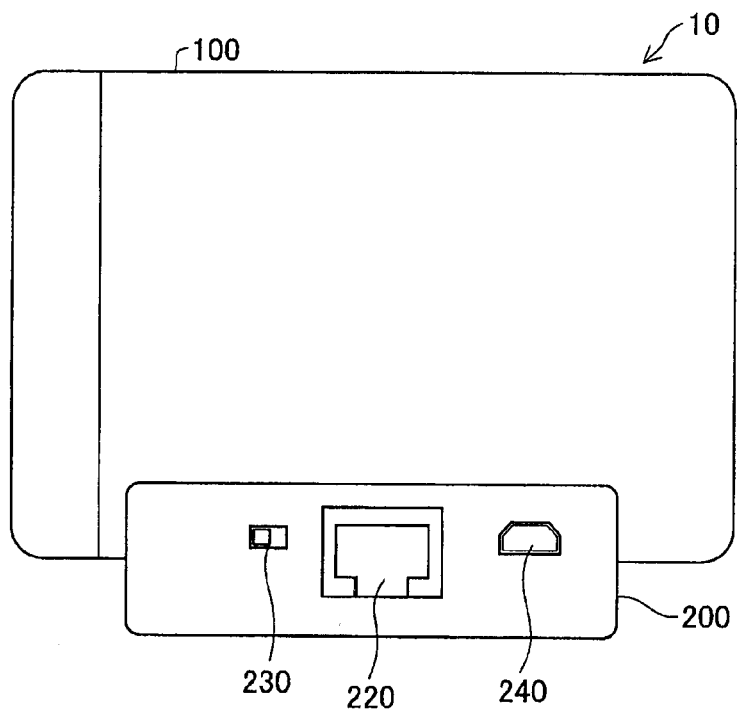
Figure 2A:
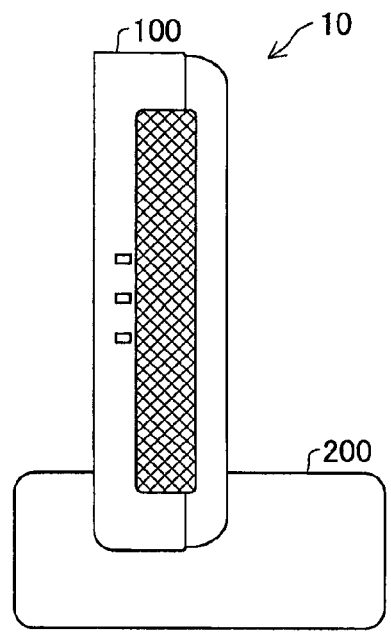
FIGS. 2A and 2B illustrate the appearance of one side face and the other side face of the portable network connection device.
Figure 2B:
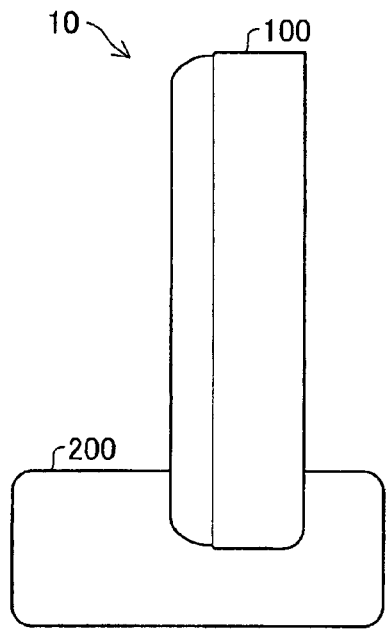

As shown in FIGS. 1B, 3B and 4, the cradle 200 includes a port 220 conforming to, for example, the IEEE 802.3/3u standard, a changeover switch 230, a main unit connection interface (I/F) 280 for connection with the main unit 100 and a LAN control circuit 210 for controlling data transfer via the port 220 according to a specified network protocol (e.g., Ethernet (registered trademark)).

The changeover switch 230 is a so-called slide switch and is disposed near the port 220. The switch 230 is manually changed over between "Internet" position and "LAN" position. In the illustrated example of FIG. 4, the changeover switch 230 is set at the "Internet" position. This changeover switch 230 is used for changing over the functions of the port 220. More specifically, when the changeover switch 230 is set at the "LAN" position, the port 220 serves as the port for connection with a client (not shown). When the changeover switch 230 is set at the "Internet" position, on the other hand, the port 220 serves as the port for connection with another device different from the client. Here the "client" means a device terminating communication at a relatively upper layer (for example, layer 4 or upper layer). The "another device different from the client" means a device terminating communication at a relatively lower layer (for example, layer 3 or lower layer) and relaying data (packets) to the client and may be, for example, a layer 2 switch, a layer 3 switch or a router.

The main unit connection interface 280 has the functions as a USB (Universal Serial Bus) device controller and exchanges information with the main unit 100 according to the USB standard, when the cradle 200 is connected with the main unit 100.

As shown in FIG. 4, the main unit 100 includes a CPU 120, a ROM 171, a RAM 172, a USB device interface (I/F) 173 for connection with a USB device, a wireless LAN control circuit 174, a wireless WAN control circuit 175, a mobile communication control circuit 176 and a cradle connection interface (I/F) 180 for connection with the cradle 200.

The wireless LAN control circuit (also called "wireless LAN interface") 174 includes a modulator, an amplifier and an antenna. The wireless LAN control circuit 174 works as a wireless LAN access point conforming to, for example, the IEEE 802.11b/g standard to wirelessly communicate with a wireless LAN client (for example, personal computer or game machine). The wireless WAN control circuit (also called "wireless WAN interface") 175 includes a modulator, an amplifier and an antenna. The wireless WAN control circuit 175 works as a wireless LAN client conforming to, for example, the IEEE 802.11a/b/g standard to wirelessly communicate with a wireless LAN access point (for example, public wireless LAN). The mobile communication control circuit (also called "mobile communication interface") 176 includes a modulator, an amplifier and an antenna. The mobile communication control circuit 176 works as a mobile communication terminal conforming to, for example, the 3G/HSPA standard to wirelessly communicate with an base station in a mobile communication network. In this manner, the main unit 100 of the embodiment includes plural wireless communication interfaces for implementing wireless communication in mutually different wireless communication networks.

The cradle communication interface 180 has the functions as a USB host controller and exchanges information with the cradle 200 according to the USB standard, when the main unit 100 is connected with the cradle 200. Additionally, the cradle connection interface 180 transmits the electric power supplied from the cradle 200 via the main unit connection interface 280 to a battery (not shown) included in the main unit 100, when the main unit 100 is connected with the cradle 200.

The CPU 120 loads and executes the firmware or computer program stored in the ROM 171 onto the RAM 172 to control the respective parts of the portable network communication device 10. More specifically the CPU 120 loads and executes the firmware or computer program stored in the ROM 171 onto the RAM 172 to serve as, for example, a transfer processing module 121, a transfer control module 122, a changeover monitor module 123 and a connection monitor module 124.

The transfer processing module 121 has a router functional part 121r and a bridge functional part 121b. The transfer processing module 121 transfers packets (layer 3 packet and layer 2 frame) via each of the wireless communication interfaces (wireless LAN control circuit 174, wireless WAN control circuit 175 and mobile communication control circuit 176) and the port 220 of the cradle 200. The transfer control module 122 controls the transfer processing module 121. The transfer control module 122 performs an operation mode changeover process described later as one of such controls to set (change over) the operation mode of the transfer processing module 121.

The changeover monitor module 123 monitors the setting of the changeover switch 230. More specifically, the change over switch 230 is connected with a GPIO (General Purpose Input/Output) port of the CPU 120 by a control line (not shown). The changeover monitor module 123 monitors the setting of the changeover switch 230 with an interrupt signal input into the CPU 120 via the control line.

The connection monitor module 124 is a functional part for monitoring whether the main unit 100 is connected with the cradle 200. The connection monitor module 124 may monitor the connection, for example, based on the supply or non-supply of electric power between the cradle connection interface 180 and the main unit connection interface 280. Alternatively, the connection monitor module 124 may monitor whether the main unit 100 is connected with the cradle 200 according to the inter-device connection detection sequence of the USB standard (for example, "connection" is detected when either of D+ and D− is equal to 3.3 V).

The ROM 171 is a so-called flash ROM as a memory writable. The ROM 171 stores in advance candidate profiles PF, in addition to programs (not shown) for implementing the respective functional parts described above. The candidate profile PF means each candidate for a set of various pieces of information (available profile) used for wireless communication by the portable network connection device 10. The candidate profile PF is provided in advance for each wireless communication endpoint. More specifically, the candidate profile PF includes various pieces of information, such as an ESSID (Extended Service Set Identifier), an encryption scheme, an encryption key (or information for generating the encryption key), and a MAC (Media Access Control) address.

Figure 5:
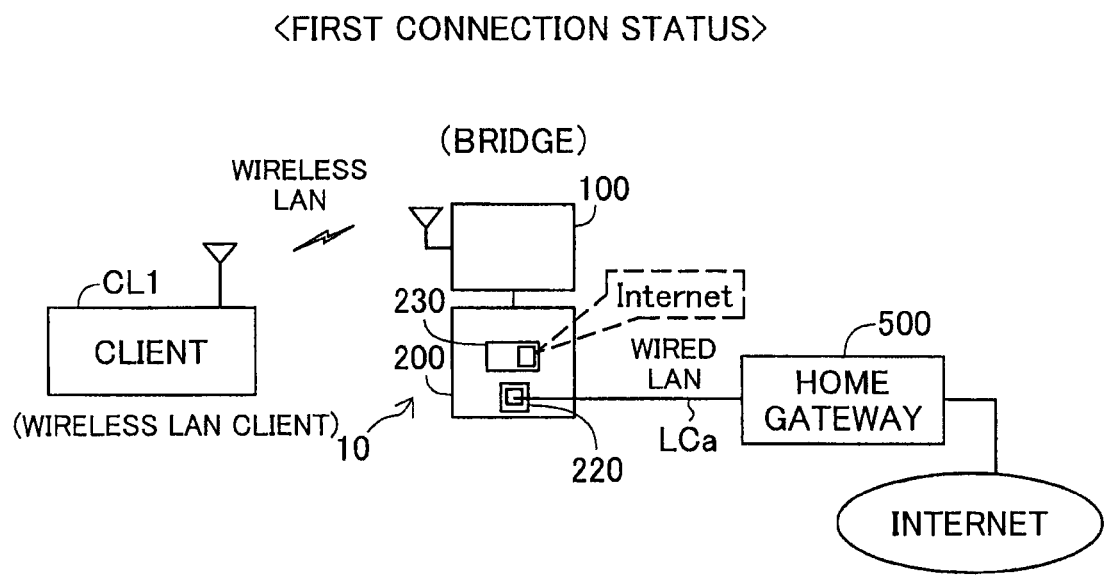
FIG. 5 shows a first connection status in the portable network connection device according to the first embodiment.
Figure 6:
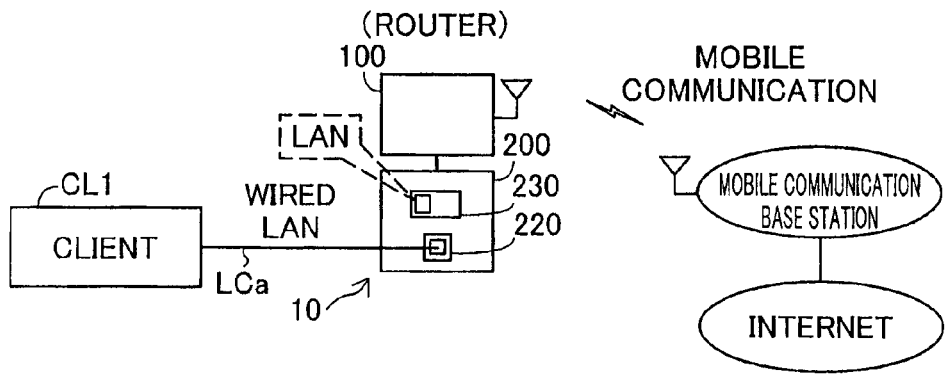
FIG. 6 shows a second connection status and a third connection status in the portable network connection device according to the first embodiment.
Figure 6:
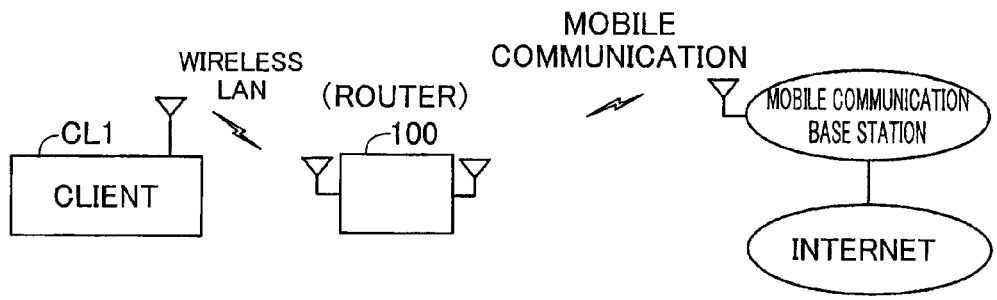
Figure 6:
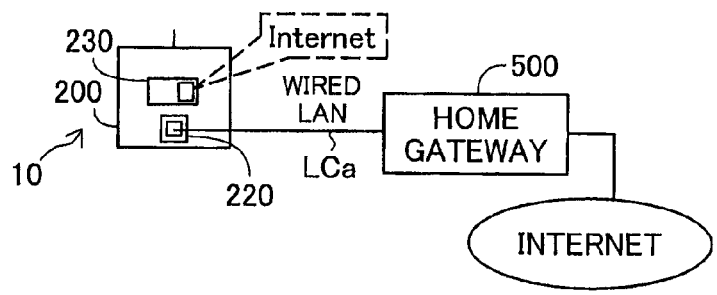

The above cradle 200 is included in the attachment unit described in the claims. The wireless WAN control circuit 175 is included in the wireless connection interface module described in the claims. A2. Connection Status FIG. 5 shows a first connection status in the portable network connection device according to the first embodiment. FIG. 6 shows a second connection status and a third connection status in the portable network connection device according to the first embodiment. The upper drawing of FIG. 6 shows the second connection status, and the lower drawing shows the third connection status.

A home gateway 500 shown in FIG. 5 and the lower drawing of FIG. 6 is disposed in a home network. This home gateway 500 has the router function and serves as a gateway in the home network for accessing the Internet. A client CL1 shown in FIGS. 5 and 6 may be, for example, a personal computer, a portable game machine or a PDA (Personal Digital Assistant).

Referring to FIG. 5, in the first connection status, the main unit 100 is connected with the cradle 200. The port 220 of the cradle 200 is connected with one end of a LAN cable LCa. The other end of the LAN cable LCa is connected with the home gateway 500. In this state, the changeover switch 230 is set at the "Internet" position as shown by the broken line in FIG. 5. In the first connection status, the portable network connection device 10 serves as the access point relative to the client CL1 of the wireless LAN and wirelessly communicates with the client CL1 via the wireless LAN control circuit 174. The portable network connection device 10 also functions as the bridge to make layer 2 communication with the home gateway 500 as the router. In this first connection status, the client CL1 is accessible to the Internet via the portable network connection device 10 and the home gateway 500.

Referring to the upper drawing of FIG. 6, in the second connection status, the main unit 100 is connected with the cradle 200. The port 220 of the cradle 200 is connected with one end of the LAN cable LCa. The other end of the LAN cable LCa is connected with the client CL1. In this state, the changeover switch 230 is set at the "LAN" position as shown by the broken line in the upper drawing of FIG. 6. In the second connection status, the portable network connection device 10 serves as the router and makes layer 3 communication with the client CL1. The portable network connection device 10 also functions as the mobile communication terminal to make wireless communication (mobile communication) via a mobile communication base station. In this second connection status, the client CL1 even without a wireless communication interface is accessible to the Internet via the portable network connection device 10 and the mobile communication base station.

Referring to the lower drawing of FIG. 6, in the third connection status, the main unit 100 is disconnected from the cradle 200. In this third connection status, the portable network connection device 10 (main unit 100) serves as the wireless LAN access point and as the router and makes layer 2 communication and layer 3 communication with the client CL1. The portable network connection device 10 (main unit 100) also serves as the mobile communication terminal to make wireless communication (mobile communication) via the mobile communication base station as in the second connection status. This third connection status may occur, for example, when the user disconnects the main unit 100 from the cradle 200, brings out the disconnected main unit 100 with the client CL1 and enables the client CL 1 to access the Internet at an outside location.

In any of the first to the third connection statuses described above, there is only one router in the home network (or the outside location). According to this embodiment, the portable network connection device 10 performs the operation mode changeover process described below to allow only one router to be present in the home network (or the outside location). In the first to the third connection statuses, the client CL1 can identify the router (gateway) used for accessing the Internet, thus ensuring smooth data exchange via the Internet.

A3. Operation Mode Changeover Process

Figure 7:
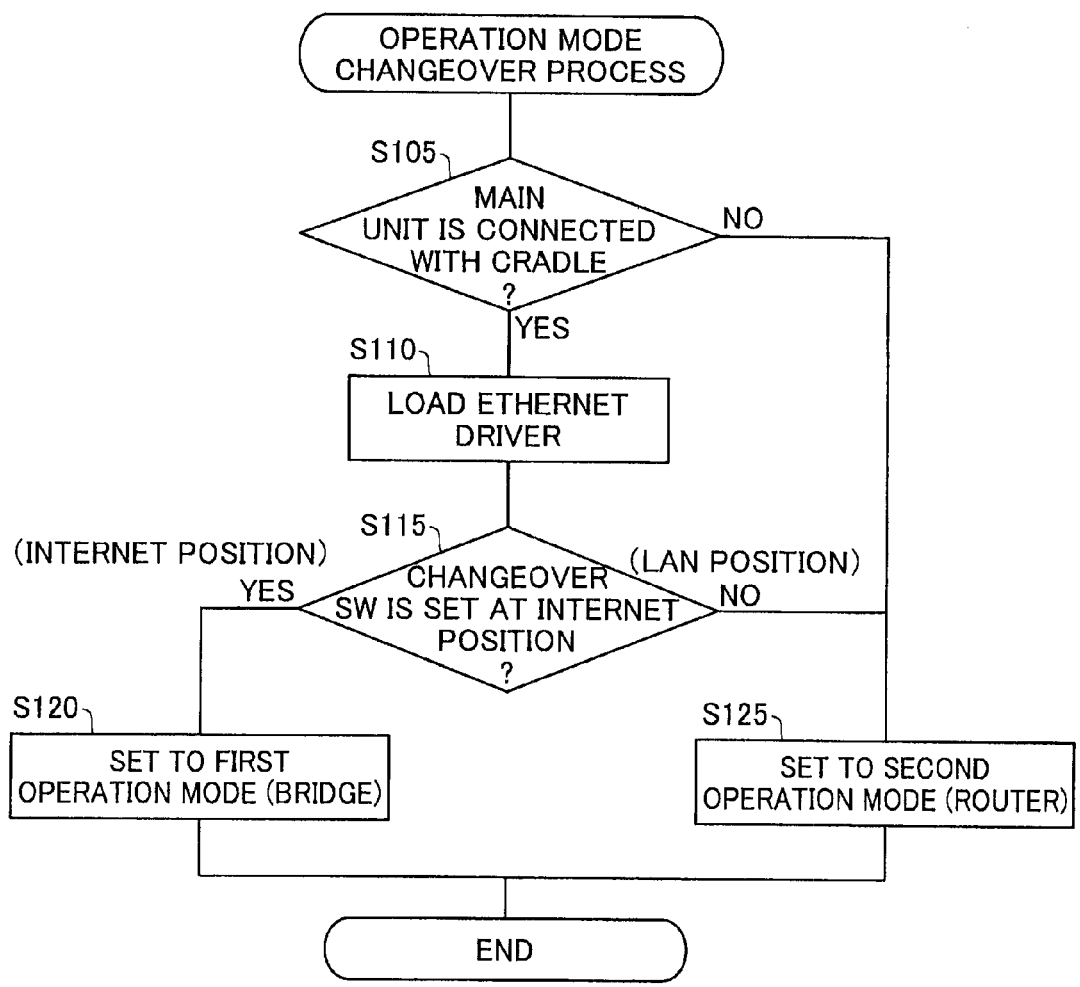
FIG. 7 is a flowchart showing the procedure of the operation mode changeover process according to the first embodiment.

FIG. 7 is a flowchart showing the procedure of the operation mode changeover process according to the first embodiment. After the portable network connection device 10 is powered ON, the connection monitor module 124 of the portable network connection device 10 continuously monitors the connection of the main unit 100 with the cradle 200 or disconnection of the main unit 100 from the cradle 200. After the portable network connection device 10 is powered ON, the changeover monitor module 123 continuously monitors the change in setting (i.e., operation or no operation) of the changeover switch 230. When there is any change in connection between the main unit 100 and the cradle 200 or when there is any change in setting of the changeover switch 230, the portable network connection device 10 performs the operation mode changeover process.

The transfer control module 122 first checks whether the main unit 100 is connected with the cradle 200, based on the information from the connection monitor module 124 (step S105). When the main unit 100 is connected with the cradle 200 (step S105: YES), the transfer control module 122 loads an Ethernet driver program (not shown) stored in the ROM 171 onto the LAN control circuit 210 of the cradle 200.

The transfer control module 122 subsequently checks whether the changeover switch 230 is set at the "Internet" position, based on the information from the changeover monitor module 123 (step S115). When the changeover switch 230 is set at the "Internet" position (step S115: YES), the transfer control module 122 sets (changes over) the operation mode of the transfer processing module 121 to a first operation mode (step S120). When the changeover switch 230 is set at the "Lan" position (step S115: NO), on the other hand, the transfer control module 122 sets the operation mode of the transfer processing module 121 to a second operation mode (step S125). In this embodiment, the first operation mode means the operation mode in which the portable network connection device 10 serves as the bridge. The second operation mode means the operation mode in which the portable network connection device 10 serves as the router.

When the main unit 100 is connected with the cradle 200 (step S105: YES) and the changeover switch 230 is set at the "Internet" position, it is estimated that the home gateway 500 is connected with the main unit 100 via the cradle 200 (i.e., the first connection status shown in FIG. 5). In this case, the home gateway 500 serves as the router, so that the portable network connection device 10 of the embodiment is operated in the first operation mode to serve as the bridge. When the main unit 100 is connected with the cradle 200 (step S105: YES) and the changeover switch 230 is set at the "LAN" position, on the other hand, it is estimated that the client CL1 is connected with the cradle 200 and that the main unit 100 is disconnected from the home gateway 500 (i.e., the second connection status shown in the upper drawing of FIG. 6). In this case, there is no router in the home network, so that the portable network connection device 10 of the embodiment is operated in the second operation mode to serve as the router.

Figure 8:
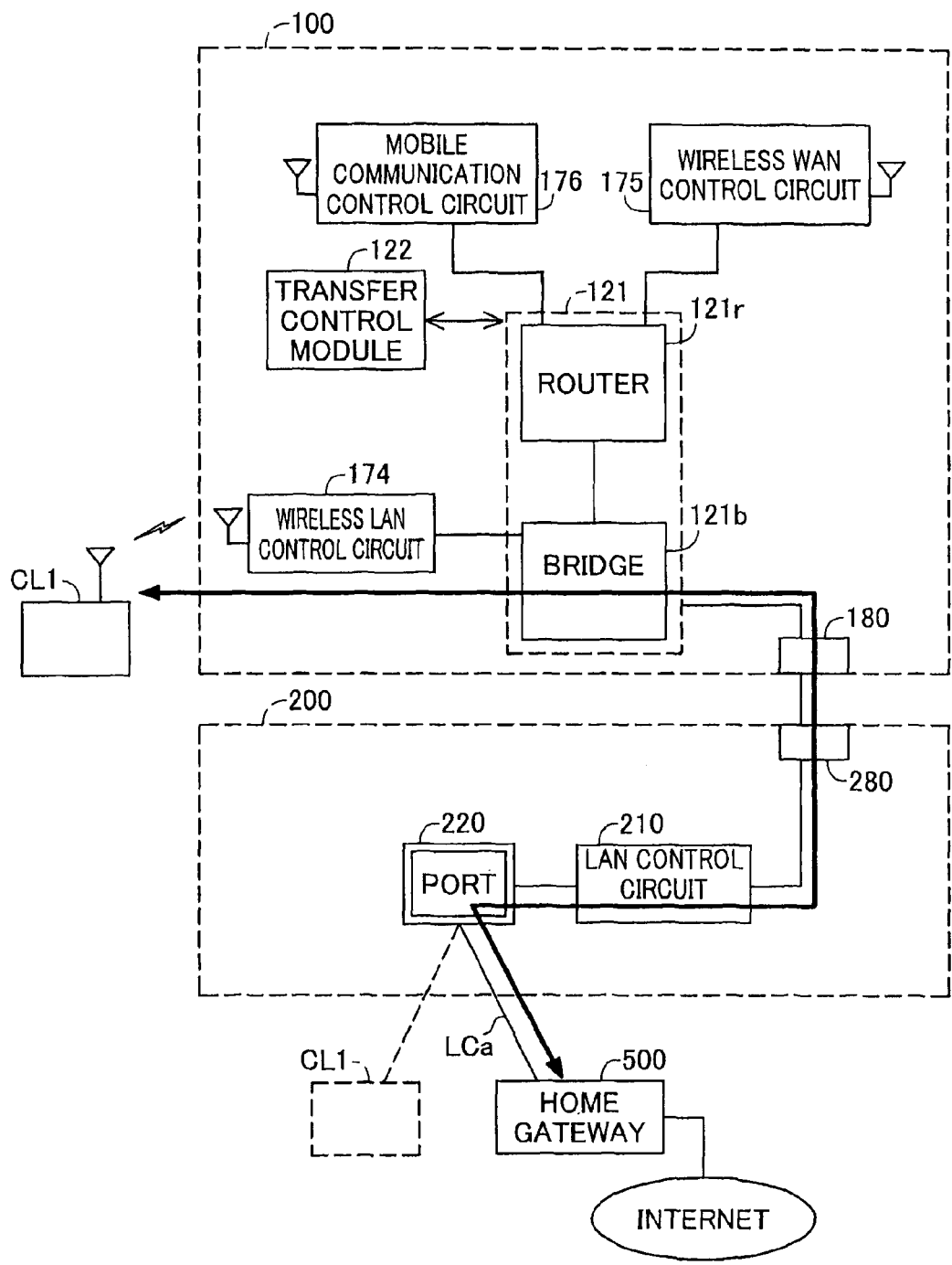
FIG. 8 schematically illustrates the transfer route of a packet when the transfer processing module operates in the first operation mode (bridge mode) in the first connection status shown in FIG. 5.

FIG. 8 schematically illustrates the transfer route of a packet when the transfer processing module 121 operates in the first operation mode (bridge mode) in the first connection status shown in FIG. 5. Part of the components of the portable network connection device 10 is omitted from the illustration of FIG. 8.

In the state of FIG. 8, when a layer 2 frame is sent from the client CL1 (wireless LAN client) via the wireless LAN, the wireless LAN control circuit 174 receives the frame and transfers the received frame to the bridge functional part 121b. The bridge functional part 121b sends the frame to the LAN control circuit 210 via the cradle connection interface 180 and the main unit connection interface 280. The LAN control circuit 210 outputs a signal including the received frame from the port 220 to the home gateway 500.

When the home gateway 500 outputs a signal including data addressed to the client CL1 to the portable network connection device 10, the LAN control circuit 210 of the portable network connection device 10 receives the signal at the port 220. The LAN control circuit 210 then generates a layer 2 frame and sends the layer 2 frame to the bridge functional part 121b. The bridge functional part 121b transfers the frame received from the LAN control circuit 210 to the wireless LAN control circuit 174. The wireless LAN control circuit 174 sends a signal including the transferred frame to the client CL1. The data transfer between the respective elements explained above is shown by a thick two-headed arrow in FIG. 8.

As described above, in the first operation mode, the bridge functional part 121b serves as the bridge. More specifically, the bridge functional part 121b layer-2 relays the layer 2 frame received from the client CL1 to the home gateway 500. The bridge functional part 121b also layer-2 relays the layer 2 frame received from the home gateway 500 to the client CL1.

Figure 9:
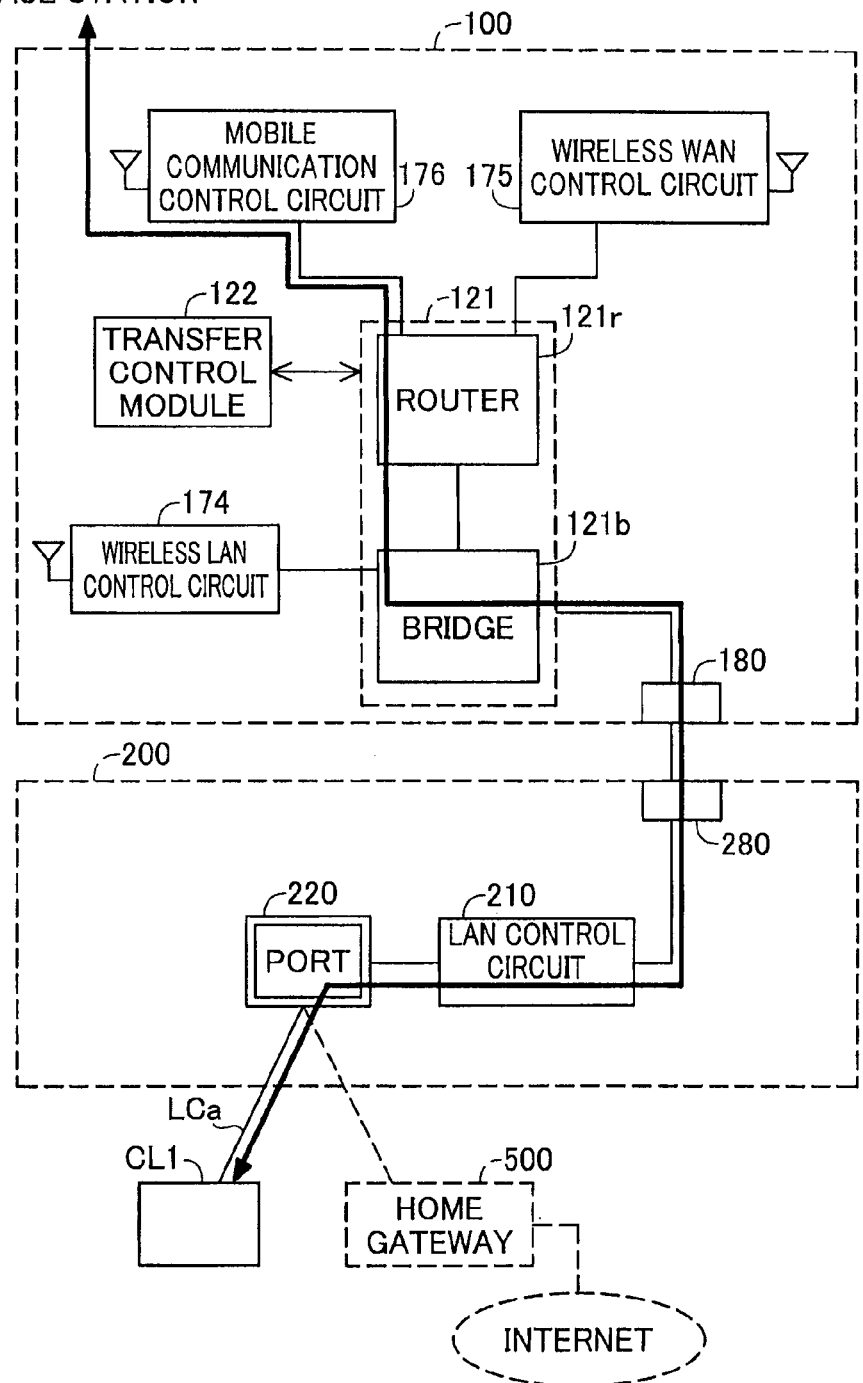
FIG. 9 schematically illustrates the transfer route of a packet when the transfer processing module operates in the second operation mode (router mode) in the second connection status shown in the upper drawing of FIG. 6.

FIG. 9 schematically illustrates the transfer route of a packet when the transfer processing module 121 operates in the second operation mode (router mode) in the second connection status shown in the upper drawing of FIG. 6. Like FIG. 8, part of the components of the portable network connection device 10 is omitted from the illustration of FIG. 9.

In the state of FIG. 9, when a signal including a layer 2 frame is sent from the client CL1 via the LAN cable LCa, the LAN control circuit 210 of the portable network connection device 10 receives the signal at the port 220. The LAN control circuit 210 then generates a layer 2 frame and sends the layer 2 frame to the bridge functional part 121b via the main unit connection interface 280 and the cradle connection interface 180. The bridge functional part 121b transfers the received frame to the router functional part 121r. The router functional part 121r generates a layer 3 packet based on the received frame and transfers the layer 3 packet to the mobile communication control circuit 176. The mobile communication control circuit 176 outputs a signal including the transferred packet to the base station.

When receiving a signal including a layer 3 packet addressed to the client CL1 from the mobile communication network, the mobile communication control circuit 176 generates the layer 3 packet and sends the layer 3 packet to the router functional part 121r. The router functional part 121r transfers the packet to the bridge functional part 121b based on the destination address. The bridge functional part 121b then generates a layer 2 frame based on the received packet and sends the layer 2 frame to the LAN control circuit 210 via the cradle connection interface 180 and the main unit connection interface 280. The LAN control circuit 210 outputs a signal including the received frame from the port 220 to the client CL1. The data transfer between the respective elements explained above is shown by a thick two-headed arrow in FIG. 9.

The foregoing describes the processing flow when the check result indicates that the main unit 100 is connected with the cradle 200 (step S105: YES) in FIG. 7. When the check result indicates that the main unit 100 is not connected with the cradle 200 (step S105: NO) in FIG. 7, on the other hand, the transfer control module 122 sets the operation mode of the transfer processing module 121 to the second operation mode (step S125).

When the main unit 100 is not connected with the cradle 200, it is estimated that the main unit 100 is disconnected from the home gateway 500, and the client CL1 and the main unit 100 are interconnected by the wireless LAN (i.e., the third connection status shown in the lower drawing of FIG. 6). In this case, there is no router in the network, to which the client CL1 belongs, so that the main unit 100 (transfer processing module 121) of this embodiment is operated in the second operation mode to serve as the router.

Figure 10:
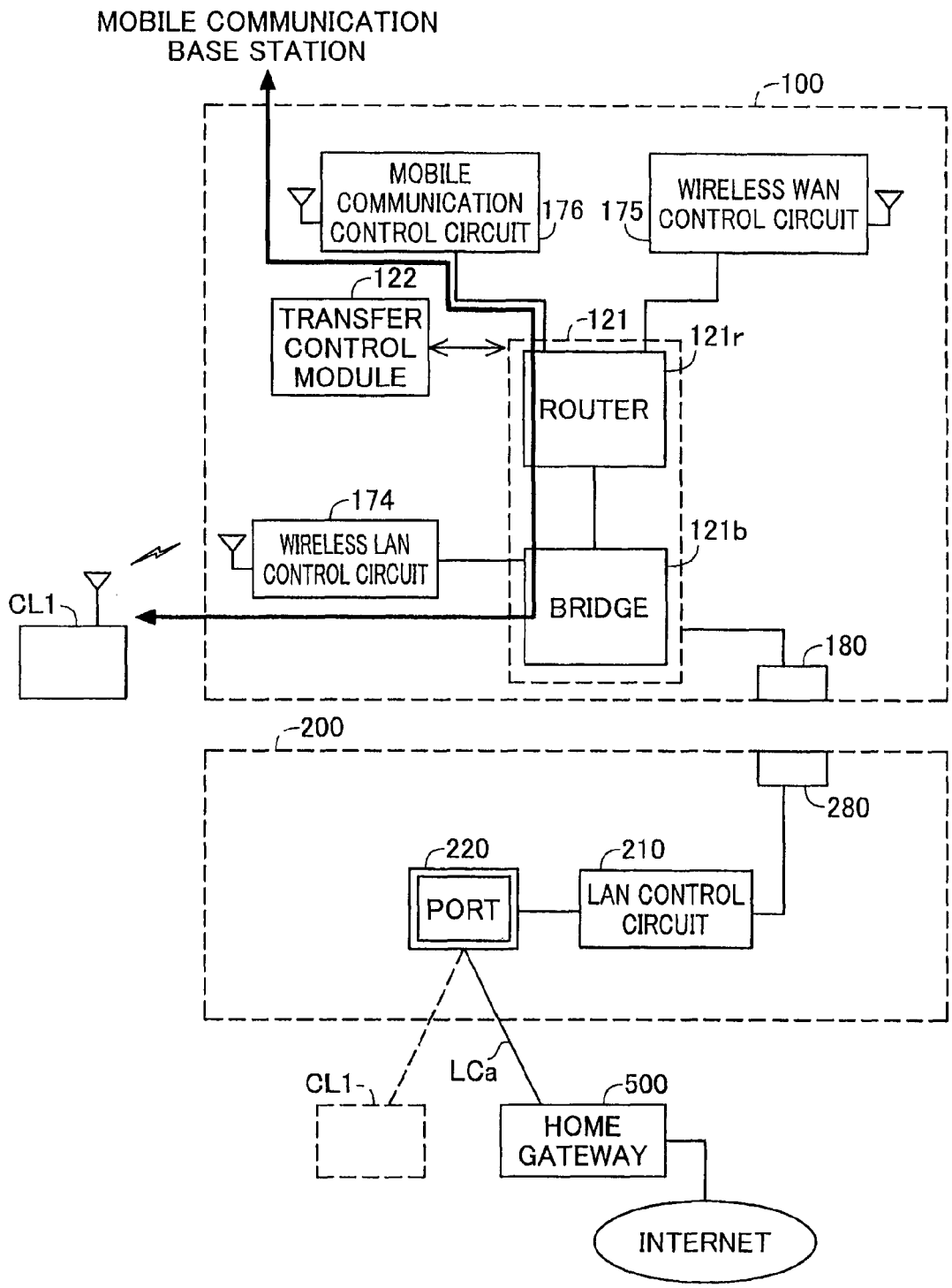
FIG. 10 schematically illustrates the transfer route of a packet when the transfer processing module operates in the second operation mode (router mode) in the third connection status shown in the lower drawing of FIG. 6.

FIG. 10 schematically illustrates the transfer route of a packet when the transfer processing module 121 operates in the second operation mode (router mode) in the third connection status shown in the lower drawing of FIG. 6. Like FIGS. 8 and 9, part of the components of the portable network connection device 10 is omitted from the illustration of FIG. 10.

In the state of FIG. 10, when a signal including a layer 2 frame is sent from the client CL1 (wireless LAN client) via the wireless LAN, the wireless LAN control circuit 174 receives the signal, generates the layer 2 frame and transfers the layer 2 frame to the bridge functional part 121b. The bridge functional part 121b transfers the received frame to the router functional part 121r. The router functional part 121r then generates a layer 3 packet based on the received frame and transfers the layer 3 packet to the mobile communication control circuit 176. The mobile communication control circuit 176 outputs a signal including the received packet to the base station.

When receiving a signal including a layer 3 packet addressed to the client CL1 from the mobile communication network, the mobile communication control circuit 176 generates the layer 3 packet and sends the layer 3 packet to the router functional part 121r. The router functional part 121r transfers the packet to the bridge functional part 121b based on the destination address. The bridge functional part 121b then generates a layer 2 frame based on the received packet and sends the layer 2 frame to the wireless LAN control circuit 174. The wireless LAN control circuit 174 sends a signal including the received frame to the client CL1. The data transfer between the respective elements explained above is shown by a thick two-headed arrow in FIG. 10.

As described above, when the connection of the portable network connection device 10 with the home gateway 500 is detected (i.e., when the first connection status is detected), the portable network connection device 10 of the first embodiment changes over the operation mode of the transfer processing module 121 to the first operation mode to serve as the bridge. This prevents the simultaneous presence of two routers (the home gateway 500 and the portable network connection device 10 functioning as the router) in the home network. The client CL1 can identify the home gateway 500 as the router to be used as the gateway for sending data to a network other than the home network, thus ensuring normal data transfer via the portable network connection device 10.

When disconnection of the portable network connection device 10 from the home gateway 500 is detected (i.e., when the second connection status or the third connection status is detected), the portable network connection device 10 sets (changes over) the operation mode of the transfer processing module 121 to the second operation mode to serve as the router. In other words, the portable network connection device 10 of the first embodiment serves as the router (i) when the main unit 100 is connected with the cradle 200 and the cradle 200 is connected with the client CL1 (second connection status) or (ii) when the main unit 100 is disconnected from the cradle 200 and both the main unit 100 and the client CL1 are disconnected from the home network (third connection status). The client CL 1 can identify the main unit 100 as the router serving as the gateway for the Internet access, thus ensuring normal data transfer.

According to this embodiment, the connection of the portable network connection device 10 with the home gateway 500 or disconnection of the portable network connection device 10 from the home gateway 500 is detected, based on the two check results: (i) whether the main unit 100 is connected with the cradle 200 (step S105 in FIG. 7); and (ii) whether the changeover switch 230 is set at the "Internet" position (step S115). The configuration of this embodiment allows for accurate detection of the connection of the portable network connection device 10 with the home gateway 500 or disconnection of the portable network connection device 10 from the home gateway 500 and requires a less number of steps to detect the connection or disconnection. This results in shortening the time period required for the operation mode changeover process.

According to this embodiment, when the user brings back the main unit 100 to the home and reconnects the main unit 100 with the cradle 200 to change the connection from the third connection status to the first connection status, the operation mode is automatically changed over from the second operation mode (router mode) to the first operation mode (bridge mode). The user can thus set (change over) the operation mode of the portable network connection device 10 by the simple method without any special operation.

B. Second Embodiment

Figure 11:
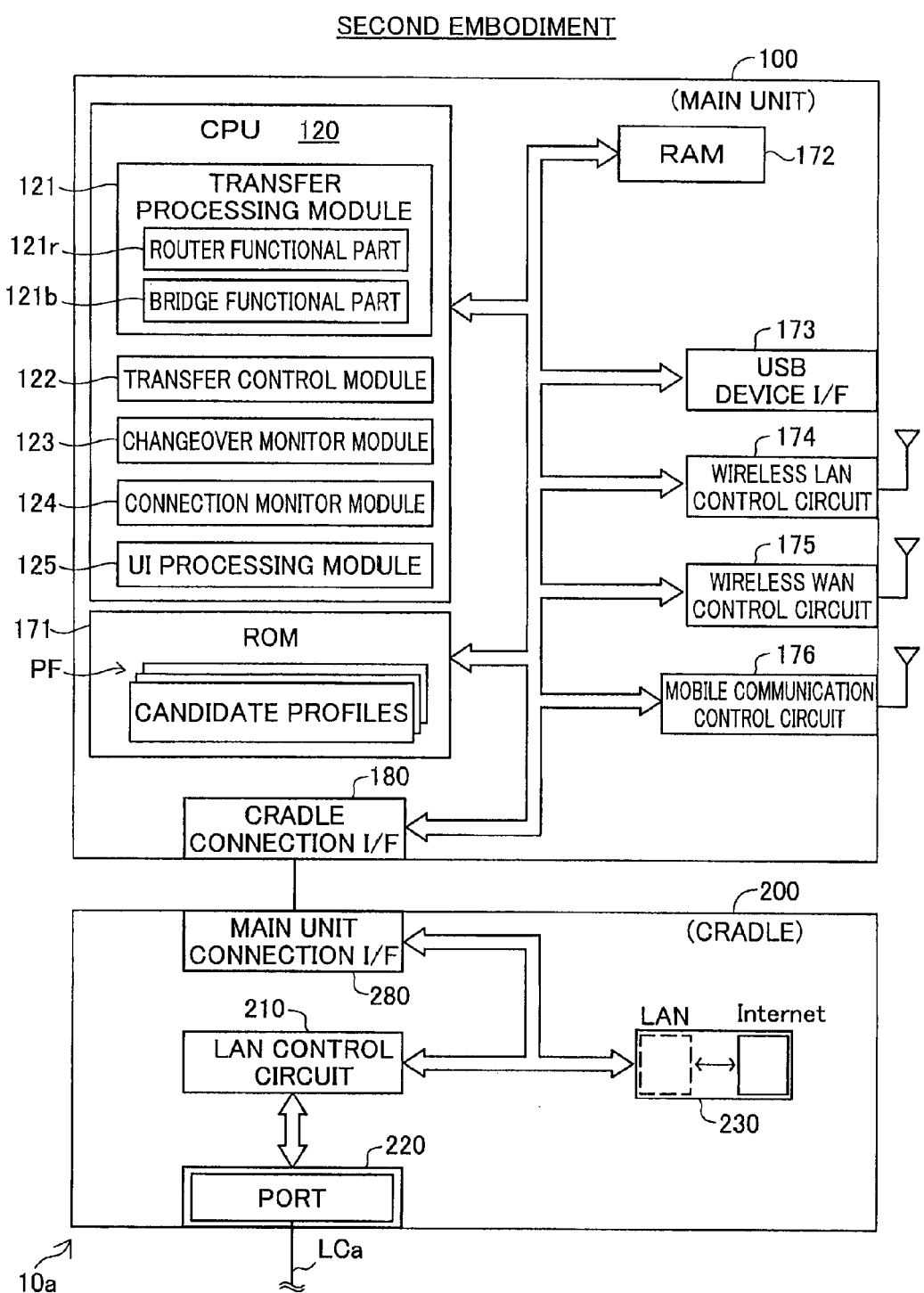
FIG. 11 shows the internal structure of a portable network connection device according to a second embodiment.
Figure 12:
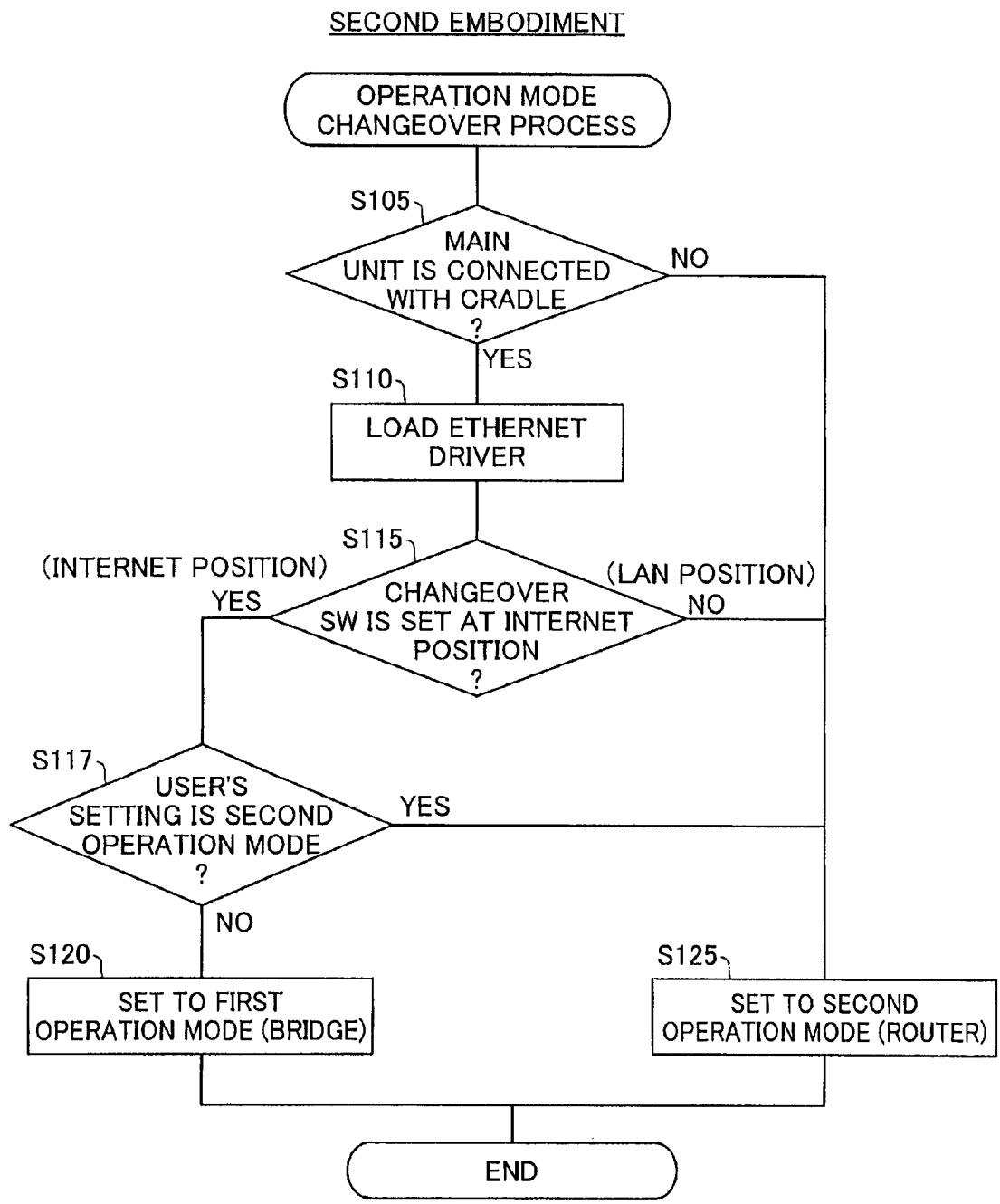
FIG. 12 is a flowchart showing the procedure of the operation mode changeover process according to the second embodiment.

FIG. 11 shows the internal structure of a portable network connection device 10a according to a second embodiment. FIG. 12 is a flowchart showing the procedure of the operation mode changeover process according to the second embodiment. The differences of the portable network connection device 10a of the second embodiment from the portable network connection device 10 of the first embodiment shown in FIG. 4 include that the CPU 120 additionally functions as a user interface (UI) processing module 125 as shown in FIG. 11 and that the operation mode changeover process includes additional step S117 as shown in FIG. 12. Otherwise the portable network connection device 10a of the second embodiment has the similar configuration and structure to those of the portable network connection device 10 of the first embodiment.

The user interface processing module 125 shown in FIG. 11 provides an administrative terminal (e.g., personal computer) connected to the main unit 100 with a menu window, while interpreting a command (instruction) input from the administrative terminal and notifying the interpreted command to the respective functional parts 121 to 124.

Referring to FIG. 12, according to the second embodiment, when the changeover switch 230 is set at the "Internet" position (step S115: YES), the transfer control module 122 controls the user interface processing module 125 and checks whether the user's setting is the second operation mode (step S117).

Figure 13:
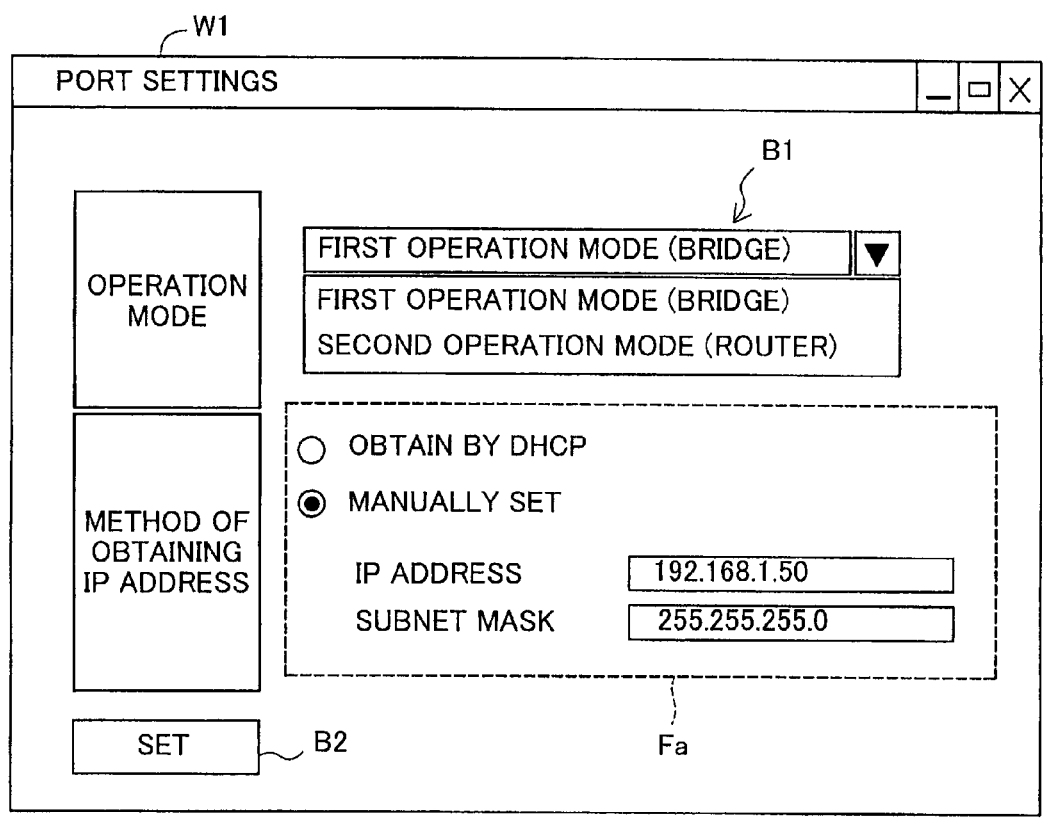
FIG. 13 shows a setting menu window for the port settings according to the second embodiment.

FIG. 13 shows a setting menu window W1 for the port settings according to the second embodiment. This setting menu window W1 is displayed on an administrative terminal AT by the user interface processing module 125. The administrative terminal AT is wirelessly connected with the main unit 100. The administrative terminal AT is included in the portable network connection device 10a. The setting menu window W1 includes a pull-down menu B1 for selecting the operation mode of the portable network connection device 10a, a field Fa for setting the method of obtaining IP address and a Set button B2. The pull-down menu B1 shows the first operation mode (bridge mode) and the second operation mode (router mode) as options of the operation mode. In the illustrated example of FIG. 13, the first operation mode is selected. When the Set button B2 is depressed in this state, the first operation mode is set to the operation mode of the portable network connection device 10a (transfer processing module 121). The user interface processing module 125 then writes the information on the operation mode set on the setting menu window W1 into the ROM 171.

When the check result indicates that the user's setting is not the second operation mode (step S117: NO) in FIG. 12, i.e., when the user's settings is the first operation mode, the processing of step S120 described previously is performed to set the operation mode of the transfer processing module 121 to the first operation mode (bridge mode). When the check result indicates that the user's setting is the second operation mode (step S117: YES), on the other hand, the processing of step S125 described previously is performed to set the operation mode of the transfer processing module 121 to the second operation mode (router mode). Unlike the first embodiment, even when the changeover switch 230 is set at the "Internet" position, the configuration of the second embodiment gives preference to the user's setting that is the second operation mode and sets the operation mode of the transfer processing module 121. This corresponds to a fourth connection status described below.

Figure 14:
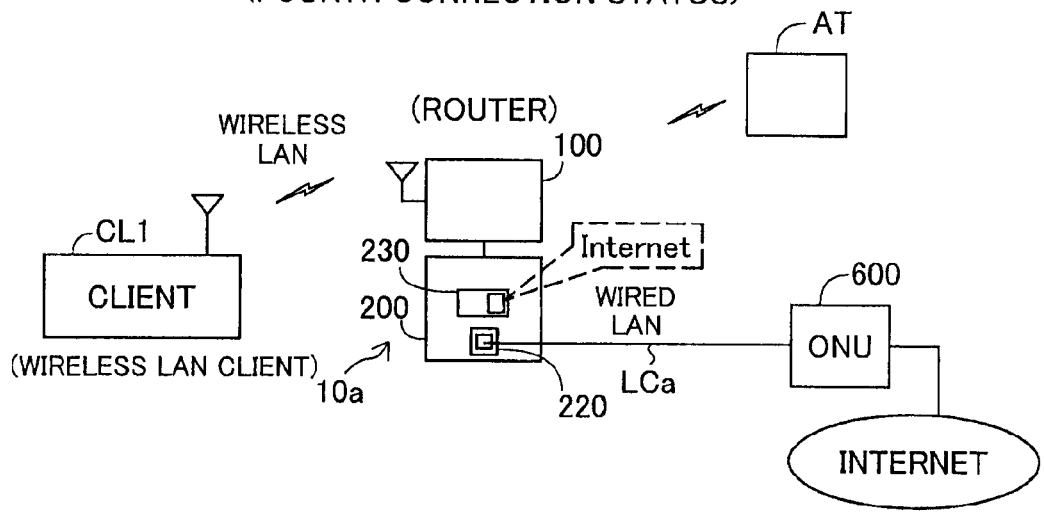
FIG. 14 shows the fourth connection status in the portable network connection device according to the second embodiment.

FIG. 14 shows the fourth connection status in the portable network connection device according to the second embodiment. The difference of the fourth connection status from the first connection status shown in FIG. 5 includes that an ONU (Optical Network Unit) 600 is connected to one end of the LAN cable LCa (i.e., the end opposite to the end connected with the port 220), in place of the home gateway 500. Otherwise the configuration of the fourth connection status is similar to that of the first connection status.

In the fourth connection status, an external network device, i.e., another device different from the client CL1 (ONU 600 in the illustrated example) is connected to the port 220, so that the changeover switch 230 is set at the "Internet" position as in the first connection status. In the fourth connection status, however, there is no router (home gateway) in the home network. The client CL 1 cannot identify the router (gateway) to be used for the Internet access and is thereby unable to access the Internet. When this connection status is required, the user selects the option "second operation mode" as the operation mode on the setting menu window W1 explained above and sets the operation mode of the portable network connection device 10a (transfer processing module 121) to the second operation mode (router mode), irrespective of the setting of the changeover switch 230.

The portable network connection device 10a of the second embodiment having the above configuration and structure has the similar advantageous effects to those of the portable network connection device 10 of the first embodiment. Additionally, the portable network connection device 10a provides the user with the setting menu window W1 (user interface) for specifying the operation mode of the portable network connection device 10a (transfer processing module 121) via the administrative terminal AT. Accordingly, the user can set the operation mode of the portable network connection device 10a to the second operation mode on the setting menu window W1, thereby causing the portable network connection device 10a to serve adequately. In the fourth connection status, the client CL1 can identify the router as the gateway, thus ensuring the normal data transfer.

The user interface processing module 125 and the setting menu window W1 of the second embodiment are included in the user interface described in the claims.

C. Third Embodiment

Figure 15:
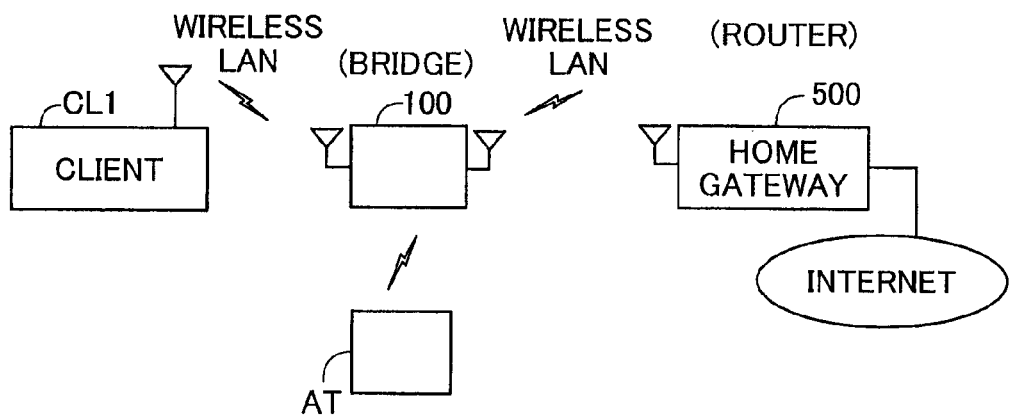
FIG. 15 shows a fifth connection status in a portable network connection device according to a third embodiment.
Figure 16:
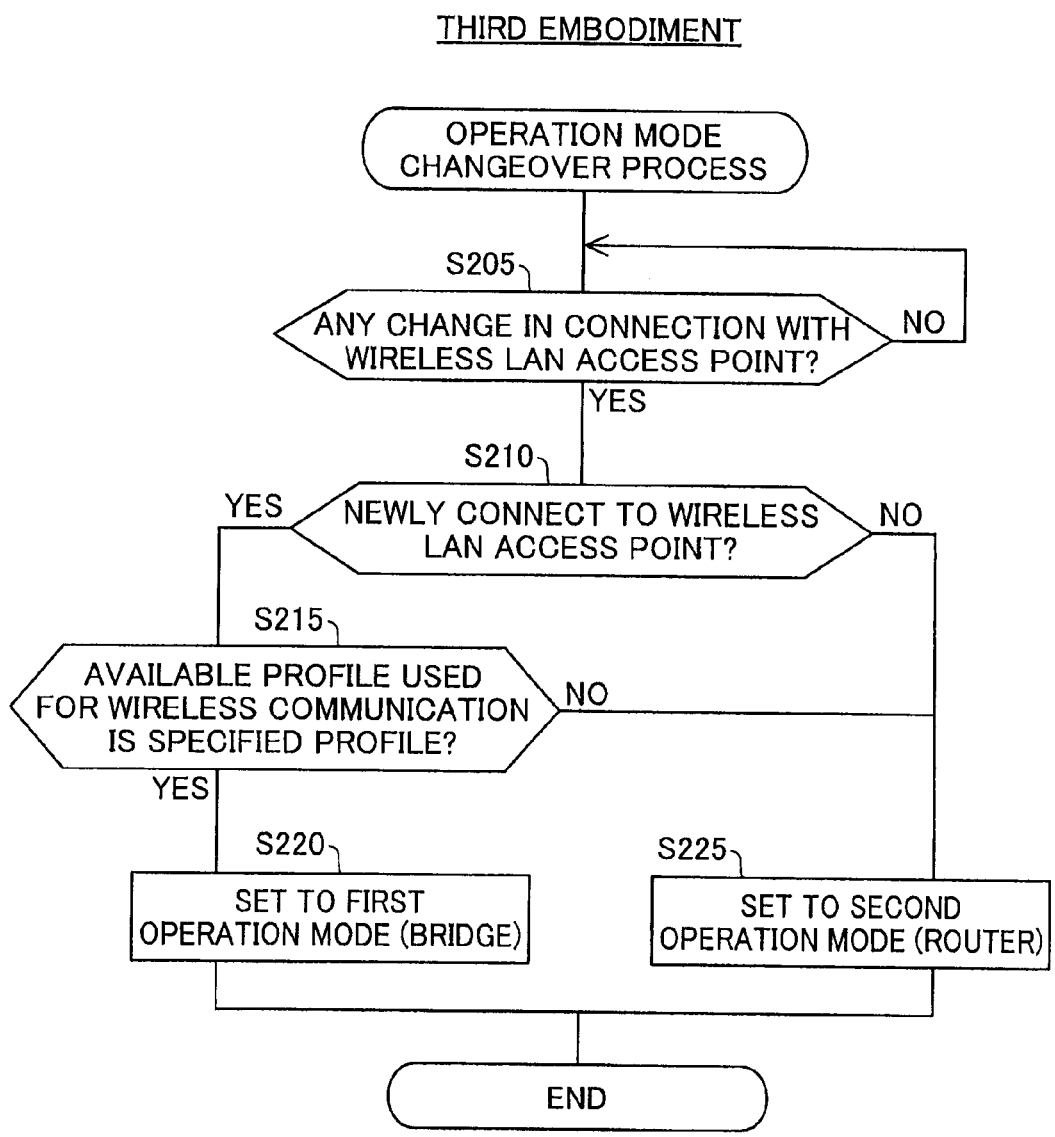
FIG. 16 is a flowchart showing the procedure of the operation mode changeover process according to the third embodiment.

FIG. 15 shows a fifth connection status in a portable network connection device according to a third embodiment. FIG. 16 is a flowchart showing the procedure of the operation mode changeover process according to the third embodiment. The differences of the portable network connection device of the third embodiment from the portable network connection device 10 of the first embodiment include that the portable network connection device is wirelessly connected with the home gateway 500 and that operation mode changeover process has a different processing flow. Otherwise the portable network connection device of the third embodiment has the similar configuration and structure to those of the portable network connection device 10 of the first embodiment.

In the fifth connection status of FIG. 15, the home gateway 500 and the portable network connection device 10 (main unit 100) are interconnected by the wireless LAN.

More specifically, the main unit 100 uses the wireless WAN control circuit 175 (FIG. 4) to serve as the wireless LAN client, while the home gateway 500 serves as the wireless LAN access point. In the configuration of the third embodiment, the home gateway 500 includes a wireless LAN interface. The main unit 100 uses the wireless LAN control circuit 174 to serve as the wireless LAN access point relative to the client CL1. The portable network connection device 10 of the third embodiment performs the operation mode changeover process shown in FIG. 16 to serve as the bridge in the fifth connection status shown in FIG. 15.

The portable network connection device 10 of the third embodiment performs the operation mode changeover process after its activation. When the portable network connection device 10 is powered on, the transfer control module 122 stands by until there is a change in connection with the wireless LAN access point (step S205) in FIG. 16. When there is a change in connection with the wireless LAN access point (step S205: YES), the transfer control module 122 checks whether the change in connection is newly connecting to the wireless LAN access point (step S210). After activation of the portable network connection device 10, the wireless WAN control circuit 175 receives beacon from the wireless LAN access point and detects the RSSI (Received Signal Strength Indication) value. When the RSSI value varies from a value lower than a preset level to a value equal to or higher than the preset level, the transfer control module 122 detects "newly connecting to the wireless LAN access point". When the RSSI value varies from a value equal to or higher than the preset level to a value lower than the preset level, on the other hand, the transfer control module 122 detects "cutting off the existing connection to the wireless LAN access point".

When the wireless WAN control circuit 175 is used to newly connect to the wireless LAN access point, an initialization sequence execution module (not shown) of the portable network connection device 10 performs an initialization sequence with the wireless LAN access point (home gateway 500 in the illustrated example of FIG. 15). According to this initialization sequence, information, such as ESSID and encryption scheme, is transferred between the portable network connection device 10 and the home gateway 500. A profile used for wireless communication (available profile) is then selected among the candidate profiles PF.

When the check result indicates newly connecting to the wireless LAN access point (step S210: YES), the transfer control module 122 subsequently identifies whether the available profile selected by the wireless WAN control circuit 175 is a specified profile (step S215). More specifically, it is identified whether the selected available profile is a profile in which the portable network connection device 10 (transfer processing module 121) is specified (set) in advance to serve as the bridge. When the available profile is the specified profile (step S215: YES), the transfer control module 122 sets the operation mode of the transfer processing module 121 to the first operation mode (bridge mode) (step S220). When the available profile is not the specified profile (step S215: NO), on the other hand, the transfer control module 122 sets the operation mode of the transfer processing module 121 to the second operation mode (router mode) (step S225).

FIG. 17 schematically shows the details of the candidate profiles PF according to the third embodiment. In the illustrated example of FIG. 17, three profiles are stored as the candidate profiles PF. Each profile includes respective pieces of information, i.e., number, profile name, bridge fixation, use interface (I/F) and detailed settings. These pieces of information are set in advance by the user with, for example, the administrative terminal AT.

Among these pieces of information, the profile name is information for identifying each profile and is arbitrarily set by the user. The bridge fixation has either ON or OFF setting. When the bridge fixation is "ON", the portable network connection device 10 serves as the bridge in a fixed manner (i.e., the portable network connection device 10 always functions as the bridge, irrespective of the conditions of the communication endpoint). When the bridge fixation is "OFF", the portable network connection device 10 does not serve as the bridge in a fixed manner (i.e., the portable network connection device 10 may typically function as the router but occasionally function as the bridge according to the conditions of the communication endpoint). The use interface (I/F) is information showing the interface type to be used for wireless communication. The detailed settings include different pieces of information according to the wireless communication endpoint; for example, the profile of number "1" includes the settings of ESSID, encryption scheme, encryption key and MAC (address). The profile of number "1" is set in advance by the user for wireless connection with the home gateway 500 as clearly understood from its profile name.

The transfer control module 122 identifies that the available profile is the specified profile at step S215 when the bridge fixation of the available profile is "ON", while identifying that the available profile is not the specified profile when the bridge fixation of the available profile is "OFF".

When the home gateway 500 is detected as the wireless LAN access point (i.e., when new connection with the home gateway 500 as the wireless LAN access point is detected) as shown in FIG. 15 and the profile of number "1" shown in FIG. 17 is selected as the available profile, the portable network connection device 10 serves as the bridge according to the bridge fixation "ON" of the available profile. In other words, the portable network connection device 10 (main unit 100) detects the connection between the portable network connection device 10 (main unit 100) and the home gateway 500, based on the available profile selected among the candidate profiles PF. In this case, the portable network connection device 10 serves as the bridge. In the fifth connection status, this configuration prevents the simultaneous presence of two routers in the home network.

When the check result indicates no newly connecting to the wireless LAN access point (i.e., when the check result indicates cutting off the existing connection) (step S210: NO), the transfer control module 122 sets the operation mode of the transfer processing module 121 to the second operation mode (router mode) (step S225). When the existing connection with the wireless LAN access point is cut off, it is estimated that the main unit 100 is located at a distance away from the home gateway 500, i.e., located in the environment with no router. In this case, the configuration of this embodiment causes the transfer processing module 121 to operate as the router and enables the client CL1 to access the Internet via the main unit 100.

The portable network connection device 10 (main unit 100) of the third embodiment having the above configuration and structure has the similar advantageous effects to those of the portable network connection device 10 of the first embodiment. Additionally, in the connection status where the home gateway 500 serves as the wireless LAN access point and wirelessly communicates with the main unit 100, the portable network connection device 10 can detects the connection between the portable network connection device 10 (main unit 100) and the home gateway 500 according to the selected available profile. Accordingly, the portable network connection device 10 (main unit 100) serves adequately with a change in connection, i.e., serving as the bridge when new connection with the home gateway 500 is detected, while serving as the router when cutoff of the existing connection with the home gateway 500 is detected.

D. Modifications

Among the various elements of the above respective embodiments, those other than the elements disclosed in independent claims are additional and supplementary elements and may be omitted or combined according to the requirements. The disclosure is not limited to the above embodiments or applications but various modifications including modified examples described below may be made to the embodiments without departing from the scope of the disclosure.

D1. Modified Example 1

The configuration and structure of the portable network connection devices 10 and 10a of the above embodiments are only illustrative and may be modified in various ways. For example, in the above embodiments, the cradle connection interface 180 of the main unit 100 and the main unit connection interface 280 of the cradle 200 exchange information according to the USB standard. The exchange of information between the main unit 100 and the cradle 200 may, however, be based on another standard different from the USB standard.

In the above embodiments, the wireless LAN control circuit 174 and the wireless WAN control circuit 175 may be wireless communication interfaces used for wireless communication not only by the wireless LAN conforming to the IEEE802.11a/b/g standard but by a general wireless LAN available in the future. Similarly, the mobile communication control circuit 176 may be a wireless communication interface used not only for mobile communication conforming to the 3G/HSPA standard but for general mobile communication available in the future, such as LTE, next-generation mobile WiMAX (IEEE802.16m) or next-generation PHS (XGP: eXtended Global Platform).

In the above embodiments, the main unit 100 includes the three different types of wireless communication interfaces, i.e., the wireless LAN control circuit 174, the wireless WAN control circuit 175 and the mobile communication control circuit 176. The main unit 100 may, however, include one or two of these three different types of wireless communication interfaces or include four or more different types of wireless communication interfaces. Alternatively the main unit 100 may include one identical type of plural wireless communication interfaces. The disclosure is not limited to the wireless LAN or mobile communication but is applicable to general wireless communication in a preset wireless communication network.

Part of the configurations implemented by the hardware in the above embodiments may be replaced by software, whilst part of the configurations implemented by the software in the above embodiments may be replaced by hardware. When part or all of the functions according to the disclosure are implemented by software, the software (computer programs) may be provided in the form of storage in a computer readable recording medium. The "computer readable recording medium" of the disclosure is not limited to the portable recording medium such as flexible disk or CD-ROM but may be an internal storage device built in the computer, such as any of various RAMs and ROMs, or an external storage device attached to the computer, such as hard disk drive. The term "computer readable recording medium" is thus used in a wider sense including any arbitrary recording medium that is capable of not temporarily but permanently storing data.

D2. Modified Example 2

In the first embodiment, the operation mode changeover process selects the first operation mode (bridge mode) when the main unit 100 is connected with the cradle 200 (step S105: YES in FIG. 7) and the changeover switch 230 is set at the "Internet" position (step S115: YES). The disclosure is, however, not restricted to this procedure. For example, in one modified configuration where the cradle 200 does not have the changeover switch 230 and the port 220 is constantly used as the port for the external network (i.e., the port used for connection with the home gateway 500), the processing of step S115 may be omitted, and the first operation mode may be selected in response to connection of the main unit 100 with the cradle 200.

The procedure of the operation mode changeover process may be modified as described below in another modified configuration where the cradle 200 does not have the port 220 but the main unit 100 has the port 220 or in another modified configuration where the main unit 100 is integrated with the cradle 200. The procedure may check whether a LAN cable is connected to the port 220, in place of checking whether the main unit 100 is connected with the cradle 200. This modified procedure may select the first operation mode when the check result indicating connection of the LAN cable to the port 220. In the configuration where the main unit 100 has the port 220, the main unit 100 is included in the portable network connection device described in the claims. In the configuration where the main unit 100 is integrated with the cradle 200, this integrated unit is included in the portable network connection device in the claims.

In a modified configuration of the second embodiment with omission of the changeover switch 230, the modified procedure may check whether the main unit 100 is connected with the cradle 200 (step S105 in FIG. 7) and identify the user's setting (step S117), while omitting checking the setting of the changeover switch 230 (step S115). More specifically, the modified procedure may (i) set the operation mode of the transfer processing module 121 to the first operation mode (bridge mode) when the main unit 100 is connected with the cradle 200 and the user's setting is the first operation mode and (ii) set the operation mode of the transfer processing module 121 to the second operation mode (router mode) when the main unit 100 is disconnected from the cradle 200 or when the user's setting is the second operation mode. This modified configuration has the similar advantageous effects to those of the second embodiment. When a device other than the router, for example, the ONU 600, is connected with the cradle 200 as in the fourth connection status shown in FIG. 14, the user may cause the portable network connection device 10 to serve as the router via the setting menu window WI. When the home gateway 500 is connected to the cradle 200 as in the first connection status shown in FIG. 5, the user may cause the portable network connection device 10 to serve as the bridge via the setting menu window W1. Additionally, this modified configuration omits the changeover switch 230, thus saving the manufacturing cost of the portable network connection device 10.

D3. Modified Example 3

In the above respective embodiments, the home gateway 500 is only the router other than the portable network connection device 10 present in the home network. The disclosure is, however, not restricted to this configuration. A dedicated machine for relaying packets (i.e., routing) without the VoIP or equivalent function may be used for the router. The disclosure may be applicable to a company network, in place of the home network.

D4. Modified Example 4

In the fifth connection status described in the third embodiment, the main unit 100 is disconnected from the cradle 200 as shown in FIG. 15. In one modified configuration, however, the main unit 100 may be connected with the cradle 200. In this modified configuration, the cradle 200 may serve as a simple charger (or holder) for the main unit 100, and wireless communication may be made between the client CL1 and the main unit 100 and between the main unit 100 and the home gateway 500.

In another modified configuration of the fifth connection status, the main unit 100 may be connected with the cradle 200, and the client CL1 may be connected with the portable network connection device 10 (cradle 200) by the LAN cable LCa. In this modified configuration, although the changeover switch 230 is set at the "LAN" position, it may be desired to make the portable network connection device 10 (transfer processing module 121) serve as the router, irrespective of the setting of the changeover switch 230, when the specified profile is used as the available profile for wireless communication between the main unit 100 and the home gateway 500. This modified configuration ensures the similar effects to those of the third embodiment.

D5. Modified Example 5

In the third embodiment, the detailed settings in each profile of the candidate profiles PF include plural pieces of information. The detailed settings in each profile of the candidate profiles PF may, however, include only one piece of information. For example, the detailed settings in each profile may include only the ESSID. The procedure of the operation mode changeover process in the third embodiment detects the connection of the portable network connection device 10 with the home gateway 500 or disconnection of the portable network connection device 10 from the home gateway 500, based on the result of identifying whether the available profile is the specified profile. The disclosure is, however, not restricted to this procedure. One modified procedure may set in advance the ESSID of the home gateway 500 as a specified ESSID and detect the connection of the portable network connection device 10 with the home gateway 500 or disconnection of the portable network connection device 10 from the home gateway 500, based on the result of checking whether this specified ESSID is used for wireless connection.

The procedure of the third embodiment may be modified to perform the following, in addition to identifying whether the available profile is the specified profile. More specifically, the modified procedure may perform at least one of checking whether the main unit 100 is connected with the cradle 200 (step S105 in FIG. 7), checking the setting of the changeover switch 230 (step S115 in FIG. 7) and checking the user's setting (step S117 in FIG. 12), and set (change over) the operation mode according to the check result. In this case, the priorities may be set to the identifying and checking results. For example, when the former two may be performed in addition to the identifying, and the higher priority is given to the result of identifying whether the available profile is the specified profile over the results of checking whether the main unit 100 is connected with the cradle 200 and checking the setting of the changeover switch 230. This modified procedure may set the operation mode of the portable network connection device 10 (transfer processing module 121) to the first operation mode (bridge mode), for example, when the main unit 100 is connected with the cradle 200, when the changeover switch 230 is set at the "LAN" position and when the available profile is the specified profile. This modified configuration also ensures the normal data transfer via the portable network connection device 10.

D6. Modified Example 6

In the second embodiment, when the main unit 100 is connected with the cradle 200, the following three states are differentiated according to the setting of the changeover switch 230 and the user's setting: (State 1) the changeover switch 230 is set at the "Internet" position and the user's setting is the "first operation mode (bridge mode)"; (State 2) the changeover switch 230 is set at the "Internet" position and the user's setting is the "second operation mode (router mode)"; and (State 3) the changeover switch 230 is set at the "LAN" position. The disclosure is, however, not restricted to this configuration. For example, a 3-state switch for changing over the above three states (State 1 to State 3) may be provided on the cradle 200, instead of the changeover switch 230. In this case, the above three states can be differentiated according to only the setting of the 3-state switch. This modified configuration shortens the time period required for eventually determining the operation mode and enables the operation mode to be specified only by one switch operation, thus improving the convenience. In the configuration using the 3-state switch, the 3-state switch is included in the user interface described in the claims.

Four states, instead of the three states (States 1 to 3), may be discriminated according to the setting of the changeover switch 230 and the user's setting or according to the setting of a 4-state switch. More specifically, four states including (State 4) the changeover switch 230 is set at the "Internet" position and the user's setting is the "first operation mode (bridge mode)", in addition to the above States 1 to 3, may be discriminated according to the setting of the changeover switch 230 and the user's setting or according to the setting of a 4-state switch. When these four states are discriminated according to the setting of the changeover switch 230 and the user's setting, a similar setting window to the setting menu window W1 may be used as the setting window of the wireless LAN control circuit 174.

A software switch may be used for changing over the plural states, instead of the physical switch such as the 3-state switch, the 4-state switch or the changeover switch 230. For example, one of the above three states may be selectively set on any of various setting menu windows (for example, a WEB window) for the portable network connection device 10 or 10a displayed on the administrative terminal AT. In this modified configuration, the setting menu window is included in the user interface described in the claims.

D7. Modified Example 7

The operation mode changeover process starts at the timing when there is a change in connection between the main unit 100 and the cradle 200 of the portable network connection device 10,10a in the first and second embodiments, but the disclosure is not restricted to this timing. For example, after activation of the portable network connection device 10 or 10a, the operation mode changeover process may be performed at regular intervals. Alternatively the operation mode changeover process may be triggered by the user's preset operation. Examples of the user's preset operation include the operations of the switches provided on the main unit 100 and the cradle 200 and the operations on the administrative terminal AT connected with the portable network connection device 10 or 10a (e.g., selection of Operation Mode Changeover Process Execution option).

D8. Modified Example 8

In the above embodiments, the changeover switch 230 is provided on the cradle 200. Alternatively the changeover switch 230 may be provided on the main unit 100, in place of the cradle 200. This modified configuration does not require the control line arranged between the main unit 100 and the cradle 200 to notify the CPU 120 of the state of the changeover switch 230. This simplifies the structure of the cradle connection interface 180 and the main unit connection interface 280. Although a slide switch is used for the changeover switch 230 in the above embodiments, the disclosure is not restricted to this structure. Any arbitrary physical switch, such as a push button switch or a rotary switch, may be used, instead of the slide switch.

D9. Modified Example 9

In the above embodiments, the operation mode can be changed over in both directions, i.e., from the first operation mode to the second operation mode and from the second operation mode to the first operation mode, according to the various conditions (connection of the main unit 100 with the cradle 200 or disconnection of the main unit 100 from the cradle 200, the setting of the switch 230, the user's setting and the available profile). The disclosure is, however, not restricted to this configuration. In one modified example, the operation mode changeover process may allow for changing over the operation mode only in one direction, from the second operation mode to the first operation mode, while prohibiting a changeover in the opposite direction (from the first operation mode to the second operation mode). In this modified example, when the main unit 100 is brought out of the home network, the user's specific operation for manually changing over the operation mode may cause the main unit 100 to serve as the router (i.e., cause the transfer processing module 121 to operate in the second operation mode). In another modified example, the operation mode changeover process may allow for changing over the operation mode only in one direction, from the first operation mode to the second operation mode, while prohibiting a changeover in the opposite direction (from the second operation mode to the first operation mode). In this modified example, when the main unit 100 is connected to the home network including the home gateway 500, the user's specific operation for manually changing over the operation mode may cause the main unit 100 to serve as the bridge (i.e., cause the transfer processing module 121 to operate in the first operation mode). In general, a portable network connection device including the operation mode control module for setting the operation mode of the packet transfer processing module to the first operation mode when the detection module detects connection to the router or a portable network connection device including the operation mode control module for setting the operation mode of the packet transfer processing module to the second operation mode when the detection module detects disconnection from the router may be applied to the portable network connection device of the disclosure.

In the description hereof, when an object selectively takes one of two states A and B, the expression of "detecting A" means detecting that the state of the object is A.

Similarly the expression of "detecting B" means detecting that the state of the object is B. Additionally, the expression of "detecting B" may also mean not-detecting that the state of the object is A. Similarly the expression of "detecting A" may also mean not-detecting that the state of the object is B.

D10. Modified Example 10

In the second embodiment, the administrative terminal AT, on which the setting menu window W1 is displayed, is wirelessly connected to the main unit 100. The administrative terminal AT may, however, have wired connection to the main unit 100. The administrative terminal AT may also have wireless or wired connection to the cradle 200. Additionally, the main unit 100 or the cradle 200 may have the function as the administrative terminal AT, on which the setting menu window W1 is displayed. In this modified configuration, it may be desired that at least one of the main unit 100 and the cradle 200 has a display unit for displaying the setting menu window W1.

What is claimed is:

1. A portable device configured to be connected to a router via a wireless or wired connection, the portable device comprising:
   a first processing section configured to operate in each of a first operation mode to serve as a bridge functional part and a second operation mode to serve as a router functional part, wherein
   the first processing section operates in the first operation mode when the portable device is connected to the router.

2. The portable device of claim 1, further comprising:
   a second processing section, wherein
   the first processing section is configured to be set to either the first operation mode or the second operation mode and operates in the set operation mode;
   the second processing section is configured to detect connection of the portable device to the router and disconnection of the portable device from the router; and
   the first processing section is configured to set the operation mode to the first operation mode when connection of the portable device to the router is detected.

3. The portable device of claim 2, wherein the first processing section is configured to set the operation mode to the second operation mode when disconnection of the portable device from the router is detected.

4. The portable device of claim 3, further comprising:
   a main unit; and
   an attachment unit configured to be connected to the router via a wired connection and detachably attached to the main unit, wherein
   the main unit comprises at least the first processing section and the second processing section, and
   the second processing section is configured to detect connection of the portable device to the router when connection of the main unit to the attachment unit is detected, and detect disconnection of the portable device from the router when disconnection of the main unit from the attachment unit is detected.

5. The portable device of claim 4, wherein
the portable device is configured to be connected with a client,
the attachment unit comprises:
   a port for connecting a network cable; and
   a switch configured to receive an input selecting a function of the port between a function for connecting with the client and a function for connecting with another device different from the client, and
the second processing section is configured to detect connection of the portable device to the router when connection of the main unit with the attachment unit is detected and the function for connecting to the another device is selected at the switch, and
the second processing section is configured to detect disconnection of the portable device from the router when disconnection of the main unit from the attachment unit is detected or when the function for connecting with the client is selected at the switch.

6. The portable device of claim 5, further comprising:
a user interface for specifying either the first operation mode or the second operation mode as the operation mode of the first processing section, wherein
the second processing section is configured to detect connection to the router when connection of the main unit to the attachment unit is detected, when the function of the port selected at the switch is the function for connecting to the another device different from the client, and when the first operation mode is specified as the operation mode of the first processing section by the user interface, and
the second processing section is configured to detect disconnection from the router when disconnection of the main unit from the attachment unit is detected, when the function of the port selected at the switch is the function for connecting with the client, or when the second operation mode is specified as the operation mode of the first processing section by the user interface.

7. The portable device of claim 4, further comprising:
a user interface for specifying either the first operation mode or the second operation mode as the operation mode of the first processing section, wherein
the second processing section is configured to detect connection of the portable device to the router when connection of the main unit to the attachment unit is detected and when the first operation mode is specified as the operation mode of the first processing section by the user interface, and
the second processing section is configured to detect disconnection of the portable device from the router when disconnection of the main unit from the attachment unit is detected or when the second operation mode is specified as the operation mode of the first processing section by the user interface.

8. The portable device of claim 2, further comprising:
a wireless connection interface module configured to control a wireless connection with the router; and
a memory configured to store candidate profiles used for wireless connection with the router by the wireless connection interface module, wherein
the second processing section is configured to detect connection of the portable device to the router when the profile used by the wireless connection interface module is a specified profile out of the candidate profiles, and detect disconnection of the portable device from the router when the profile used by the wireless connection interface module is not the specified profile.

9. The portable device of claim 8, wherein the profile includes at least an Extended Service Set Identifier (ESSID).

10. The portable device of claim 2, further comprising:
a mobile communication network control module configured to control wireless communication in a mobile communication network.

11. A portable device configured to be connected to a router via a wireless or wired connection, the portable device comprising:
a first processing section configured to operate in each of a first operation mode to serve as a bridge functional part or a second operation mode to serve as a router functional part, wherein
the first processing section operates in the second operation mode when the portable device is disconnected from a router.

12. The portable device of claim 11, further comprising:
a second processing section, wherein
the first processing section is configured to be set to either the first operation mode or the second operation mode and operates in the set operation mode;
the second processing section is configured to detect connection of the portable device to the router and disconnection of the portable device from the router; and
the first processing section is configured to set the operation mode to the second operation mode when disconnection of the portable device from the router is detected.

13. The portable device of claim 12, wherein the first processing section is configured to set the operation mode to the first operation mode when connection of the portable device to the router is detected.

14. The portable device of claim 13, comprising:
a main unit; and
an attachment unit configured to be connected to the router via a wired connection and detachably attached to the main unit, wherein
the main unit comprises at least the first processing section and the second processing section, and
the second processing section is configured to detect connection of the portable device to the router when connection of the main unit with the attachment unit is detected, and detect disconnection of the portable device from the router when disconnection of the main unit from the attachment unit is detected.

15. A method of setting an operation mode for packet transfer in a portable device configured to be connected to a router via a wireless or wired connection, the method comprising:
operating a processing section in the portable device in either a first operation mode to serve as a bridge functional part or a second operation mode to serve as a router functional part; and
operating the processing section in the first operation mode when the portable device is connected to a router.

16. A method of setting an operation mode for packet transfer in a portable device configured to be connected to a router via a wireless or wired connection, the method comprising:
operating a processing section in the portable device in either a first operation mode to serve as a bridge functional part or a second operation mode to serve as a router functional part; and
operating the processing section in the second operation mode when the portable device is disconnected from a router.

17. A non-transitory computer-readable medium including computer program instruction, which when executed by a portable device, cause the portable device to perform a method comprising:
operating a processing section in either a first operation mode to serve as a bridge functional part or a second operation mode to serve as a router functional part; and
operating the processing section in the first operation mode when the portable device is connected to a router.

18. A non-transitory computer-readable medium including computer program instruction, which when executed by a portable device, cause the portable device to perform a method comprising:
operating a processing section in either a first operation mode to serve as a bridge functional part or a second operation mode to serve as a router functional part; and
operating the processing section in the second operation mode when the portable device is disconnected from a router.

* * * * *